United States Patent
Chen

(10) Patent No.: US 12,273,435 B2
(45) Date of Patent: Apr. 8, 2025

(54) METHOD OF DEFENSE AGAINST CRYPTOSYSTEM TIMING ATTACK, ASSOCIATED CRYPTOSYSTEM PROCESSING CIRCUIT, AND ASSOCIATED ELECTRONIC DEVICE

(71) Applicant: Realtek Semiconductor Corp., HsinChu (TW)

(72) Inventor: Yuefeng Chen, Suzhou (CN)

(73) Assignee: Realtek Semiconductor Corp., HsinChu (TW)

( * ) Notice: Subject to any disclaimer, the term of this patent is extended or adjusted under 35 U.S.C. 154(b) by 137 days.

(21) Appl. No.: 17/887,491

(22) Filed: Aug. 14, 2022

(65) Prior Publication Data
US 2023/0261851 A1  Aug. 17, 2023

(30) Foreign Application Priority Data
Feb. 16, 2022  (CN) .......................... 202210143245.4

(51) Int. Cl.
*H04L 9/00* (2022.01)
*H04L 9/30* (2006.01)

(52) U.S. Cl.
CPC ............. *H04L 9/005* (2013.01); *H04L 9/302* (2013.01)

(58) Field of Classification Search
CPC ................................ H04L 9/005; H04L 9/302
See application file for complete search history.

(56) References Cited

U.S. PATENT DOCUMENTS

| | | |
|---|---|---|
| 7,177,423 B2 | 2/2007 | Antipa |
| 7,197,141 B2 | 3/2007 | Kim |
| 7,327,847 B2 | 2/2008 | Cachin |
| 7,421,074 B2 | 9/2008 | Jin |
| 8,139,763 B2 | 3/2012 | Boscher |
| 8,369,519 B2 | 2/2013 | Liardet |
| 9,571,281 B2 | 2/2017 | Kim |
| 9,949,115 B2 | 4/2018 | Avanzi |
| 11,063,743 B2 | 7/2021 | Gouget |

(Continued)

FOREIGN PATENT DOCUMENTS

CN    100414492 C    8/2008

*Primary Examiner* — Saleh Najjar
*Assistant Examiner* — Devin E Almeida
(74) *Attorney, Agent, or Firm* — Winston Hsu

(57) ABSTRACT

A method of defense against cryptosystem timing attack such as Rivest-Shamir-Adleman (RSA) cryptosystem timing attack, an associated cryptosystem processing circuit and an associated electronic device are provided. The method may include: utilizing a point double calculation circuit to perform a plurality of point double calculation operations related to a predetermined cryptosystem; utilizing a point add calculation circuit to perform a plurality of point add calculation operations related to the predetermined cryptosystem; and in response to there being no need to perform any point add calculation operation related to the predetermined cryptosystem, utilizing a dummy point add calculation circuit to perform a dummy point add calculation operation to emulate a calculation time of performing the any point add calculation operation, without changing a calculation result before performing the dummy point add calculation operation.

10 Claims, 5 Drawing Sheets

(56) References Cited

U.S. PATENT DOCUMENTS

| | | | |
|---|---|---|---|
| 2001/0033655 A1* | 10/2001 | Vadekar | H04L 9/3066 708/492 |
| 2009/0010424 A1* | 1/2009 | Qi | H04L 9/005 717/106 |
| 2010/0064142 A1* | 3/2010 | Matsuzaki | G06F 7/728 713/189 |
| 2010/0232603 A1* | 9/2010 | Itoh | H04L 9/003 380/30 |
| 2018/0062844 A1* | 3/2018 | Dubeuf | H04L 9/005 |
| 2019/0089523 A1* | 3/2019 | Adjedj | G06F 7/728 |
| 2023/0231696 A1* | 7/2023 | Chen | H04L 9/0861 713/189 |

* cited by examiner

METHOD OF DEFENSE AGAINST CRYPTOSYSTEM TIMING ATTACK, ASSOCIATED CRYPTOSYSTEM PROCESSING CIRCUIT, AND ASSOCIATED ELECTRONIC DEVICE

BACKGROUND OF THE INVENTION

1. Field of the Invention

The present invention is related to cryptosystem protection, and more particularly, to a method of defense against cryptosystem timing attack such as Rivest-Shamir-Adleman (RSA) cryptosystem timing attack, an associated cryptosystem processing circuit, and associated electronic devices.

2. Description of the Prior Art

According to related art, a private key may be utilized to perform RSA decryption calculation. Some problems may occur, however. For example, if an attacker can obtain the time of processing each bit in the RSA calculation, the attacker may obtain the private key from one processing architecture without proper protection. In the related art, some advices are provided to try to address this problem, but may cause additional problems (e.g., certain side effects). As a result, a novel method and associated architecture are needed for realizing an electronic device with a reliable cryptosystem without introducing any side effect or in a way that is less likely to introduce a side effect.

SUMMARY OF THE INVENTION

It is therefore an objective of the present invention to provide a method of defense against cryptosystem timing attack (e.g., RSA cryptosystem timing attack), an associated cryptosystem processing circuit, and associated electronic devices, to address the above-mentioned problems.

According to at least one embodiment of the present invention, a method of defense against cryptosystem timing attack is provided. The method may comprise: utilizing a point double calculation circuit to perform a plurality of point double calculation operations related to an RSA cryptosystem; utilizing a point add calculation circuit to perform a plurality of point add calculation operations related to the RSA cryptosystem; and in response to there being no need to perform any point add calculation operation related to the RSA cryptosystem, utilizing a dummy point add calculation circuit to perform a dummy point add calculation operation to emulate a calculation time of performing the any point add calculation operation, without changing a calculation result before performing the dummy point add calculation operation.

According to some embodiments of the present invention, a cryptosystem processing circuit that operates according to the above-mentioned method is provided. The cryptosystem processing circuit may comprise a core circuit, and further comprise the point double calculation circuit, the point add calculation circuit, and the dummy point add calculation circuit that are coupled to the core circuit. The core circuit may be arranged to control a plurality of cryptosystem processing operations related to the RSA cryptosystem in the cryptosystem processing circuit, wherein the plurality of cryptosystem processing operations comprise the plurality of point double calculation operations and the plurality of point add calculation operations. Additionally, the point double calculation circuit may be arranged to perform the plurality of point double calculation operations, the point add calculation circuit may be arranged to perform the plurality of point add calculation operations, and the dummy point add calculation circuit may be arranged to perform the dummy point add calculation operation.

According to some embodiments of the present invention, an electronic device comprising the above-mentioned cryptosystem processing circuit is further provided, wherein the electronic device may further comprise a processor, a memory, and a communications interface circuit. The processor may be arranged to control operations of the electronic device. The memory may be arranged to temporarily store information for the electronic device. The communications interface circuit may be arranged to perform communications operations for the electronic device.

According to some embodiments of the present invention, an electronic device comprising the above-mentioned cryptosystem processing circuit is further provided, wherein the electronic device may comprise a processor, and the core circuit may be implemented by the processor. The processor may be arranged to control operations of the electronic device. Additionally, the electronic device may further comprise a memory and a communications interface circuit. The memory may be arranged to temporarily store information for the electronic device. The communications interface circuit may be arranged to perform communications operations for the electronic device.

One of the benefits of the present invention is that, by carefully designing the control mechanism, the method of the present invention can prevent any attacker from obtaining the difference between the respective time of processing respective bits in the RSA calculation, and can try to prevent the difference in power consumption, and thus can prevent the private key from being obtained. In addition, implementing the cryptosystem in the electronic device according to the method of the present invention will not increase the cost greatly. In comparison with the related art, the method of the present invention can realize an electronic device with a robust cryptosystem introducing no or less side effects.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
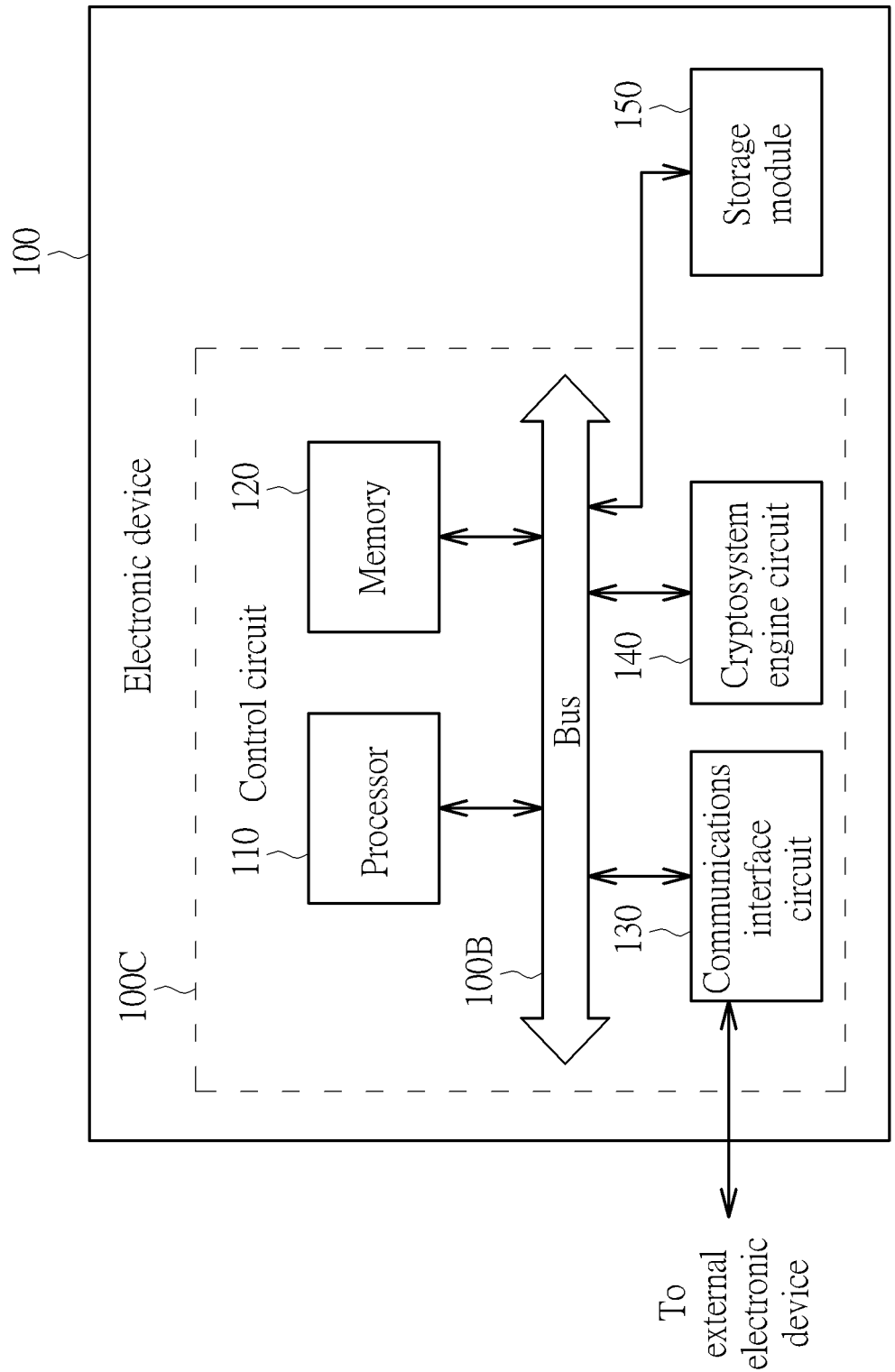
FIG. 1 is a diagram illustrating an electronic device equipped with cryptosystem processing function according to an embodiment of the present invention.

FIG. 1 is a diagram illustrating an electronic device 100 equipped with cryptosystem processing function according to an embodiment of the present invention. The electronic device 100 may comprise e.g., a processor 110, a memory 120, a communications interface circuit 130, a cryptosystem engine circuit 140, and a storage module 150, and these components may be coupled to each other through a bus 100B. More particularly, a control circuit 100C of the electronic device 100 may comprise the processor 110, the memory 120, the communications interface circuit 130, and the cryptosystem engine circuit 140, and may be implemented by way of a system on chip (SoC), etc.

According to this embodiment, the processor 110 may be arranged to control operations of the electronic device 100. Under control of the processor 110, the memory 120 may be arranged to temporarily store information for the electronic device 100 (e.g., for being used as a buffer), and the communications interface circuit 130 may perform communications operations for the electronic device 100, and more particularly, may be coupled to an external electronic device to communicate with the external electronic device (labeled as "To external electronic device" for brevity). In addition, the cryptosystem engine circuit 140 may provide the cryptosystem processing function, to make the electronic device 100 protect important data such as the user data according to a predetermined cryptosystem. Additionally, the storage module 150 may be arranged to store information, and more particularly, store the important data such as the user data.

For better comprehension, the electronic device 100 may represent a storage device (e.g., a universal serial bus (USB) flash drive or a solid state drive (SSD)), and the external electronic device may represent a control device that utilizes the electronic device 100 to store the user data (e.g., a desktop computer or a laptop computer), wherein the storage module 150 may comprise a storage medium that is arranged to store the user data (e.g., a flash memory), but the present invention is not limited thereto. In some embodiments, the type of the electronic device 100 and/or the architecture shown in FIG. 1 may vary.

In the embodiment shown in FIG. 1, the storage module 150 may be illustrated outside the control circuit 100C, but the present invention is not limited thereto. In some embodiments, the storage module 150 may be integrated into the control circuit 100C, and thus may be illustrated as being positioned in the control circuit 100C.

According to some embodiments, the predetermined cryptosystem may be an RSA cryptosystem and the cryptosystem engine circuit 140 may be an RSA cryptosystem engine circuit, but the present invention is not limited thereto. In some embodiments, the predetermined cryptosystem may be an elliptic curve cryptosystem (ECC), and the cryptosystem engine circuit 140 may be an ECC engine circuit.

Figure 2:
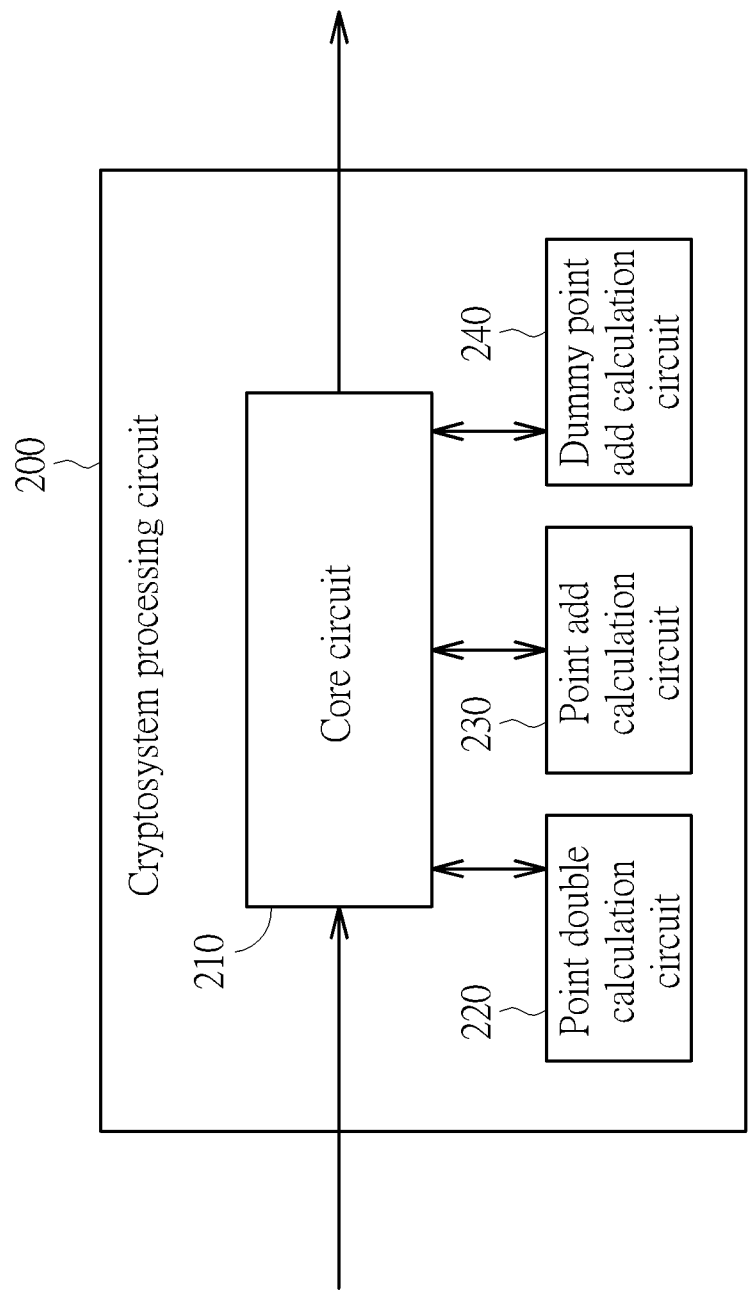
FIG. 2 is a diagram illustrating a cryptosystem processing circuit according to an embodiment of the present invention, wherein the cryptosystem processing circuit shown in FIG. 2 may act as an example of the cryptosystem engine circuit shown in FIG. 1.

FIG. 2 is a diagram illustrating a cryptosystem processing circuit 200 according to an embodiment of the present invention, wherein the cryptosystem processing circuit 200 shown in FIG. 2 may act as an example of the cryptosystem engine circuit 140 shown in FIG. 1, but the present invention is not limited thereto. The cryptosystem processing circuit 200 may comprise multiple sub-circuits such as a core circuit 210, point double calculation circuit 220, a point add calculation circuit 230 and a dummy point add calculation circuit 240. As shown in FIG. 2, the point double calculation circuit 220, the point add calculation circuit 230 and the dummy point add calculation circuit 240 may be coupled to the core circuit, respectively. For example, the core circuit 210 may control a plurality of cryptosystem processing operations related to the predetermined cryptosystem in the cryptosystem processing circuit 200, and more particularly, may utilize the point double calculation circuit 220 and the point add calculation circuit 230 to perform a plurality of point double calculation operations and a plurality of point add calculation operations related to an RSA cryptosystem, respectively, where the plurality of cryptosystem processing operations may comprise the plurality of point double calculation operations and the plurality of point add calculation operations. In addition, when there is no need to perform any point add calculation operation related to the RSA cryptosystem, the core circuit 210 may utilize the dummy point add calculation circuit 240 to perform a dummy point add calculation operation to emulate a calculation time of performing the any point add calculation operation, without changing a calculation result before performing the dummy point add calculation operation. As a result, the cryptosystem processing circuit 200 can perform the dummy point add calculation operation, without changing the calculation result before performing the dummy point add calculation operation, as if performing one of the plurality of point add calculation operations, in order to prevent any attacker from obtaining the difference between the respective time of processing respective bits in the plurality of cryptosystem processing operations (e.g., RSA calculation operations), and can try to prevent the difference in power consumption, and thus can prevent the private key from being obtained.

For better comprehension, the hardware structure of the cryptosystem processing circuit 200 shown in FIG. 2 can be taken as an example of the hardware structure of the cryptosystem engine circuit 140 shown in FIG. 1, and more particularly, the cryptosystem engine circuit 140 may comprise the multiple sub-circuits of the cryptosystem processing circuit 200, such as the core circuit 210, the point double calculation circuit 220, the point add calculation circuit 230 and the dummy point add calculation circuit 240, but the invention is not limited thereto. For example, the processor 110 shown in FIG. 1 can be arranged to perform the operations of the core circuit 210, and more particularly, the cryptosystem engine circuit 140 may comprise a portion of sub-circuits among the multiple sub-circuits of the cryptosystem processing circuit 200, such as the point double calculation circuit 220, the point add calculation circuit 230 and the dummy point add calculation circuit 240, and the core circuit 210 may be implemented by the processor 110.

Figure 3:
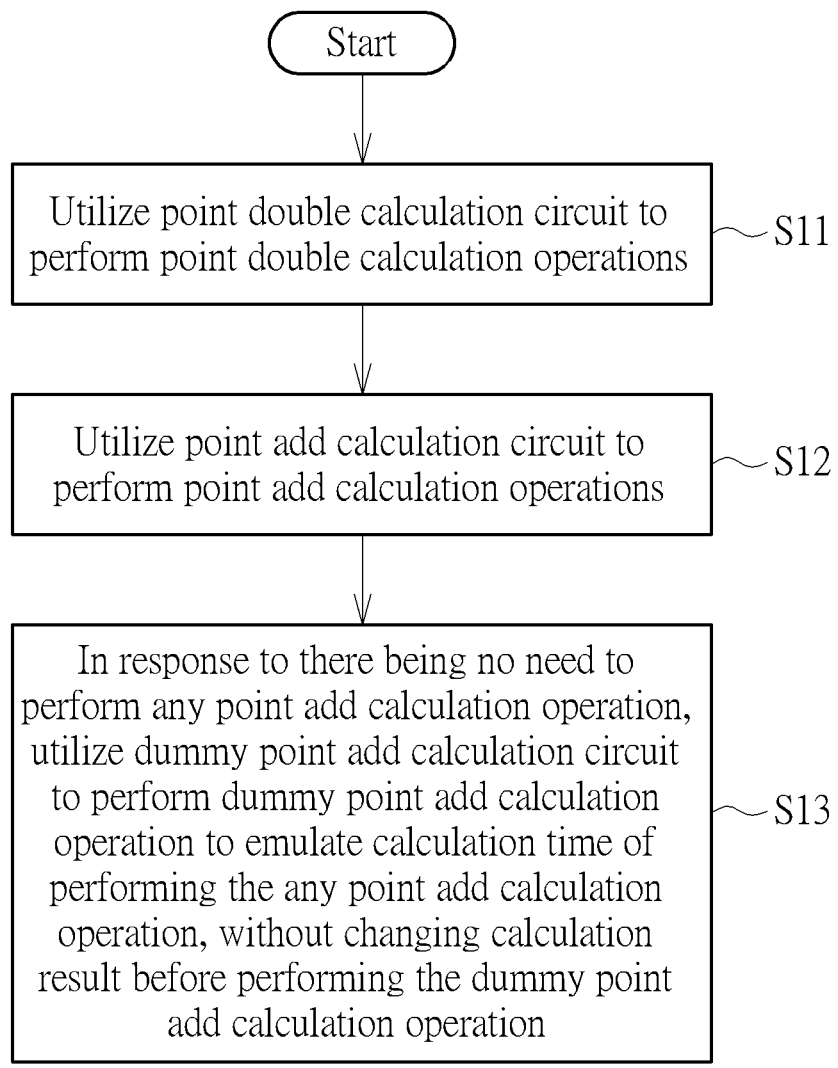
FIG. 3 is a flow chart of a method of defense against cryptosystem timing attack (e.g., RSA cryptosystem timing attack).

FIG. 3 is a flow chart of a method of defense against cryptosystem timing attack (e.g., RSA cryptosystem timing attack). The method is applicable to the electronic device 100 shown in FIG. 1 and the components therein (e.g., the processor 110, the memory 120, the communications interface circuit 130 and the cryptosystem engine circuit 140), and more particularly, is applicable to the cryptosystem processing circuit 200 shown in FIG. 2. For example, the predetermined cryptosystem can be the RSA cryptosystem, and the cryptosystem processing circuit 200 can be an RSA cryptosystem processing circuit, but the present invention is not limited thereto.

In Step S11, the cryptosystem processing circuit 200 (e.g., the core circuit 210) may utilize the point double calculation circuit 220 to perform the plurality of point double calculation operations related to the predetermined cryptosystem. For example, in a situation where the plurality of cryptosystem processing operations of the cryptosystem processing circuit 200 are a plurality of RSA cryptosystem processing operations related to the RSA cryptosystem, the plurality of point double calculation operations may represent a plurality of RSA point double calculation operations among the plurality of RSA cryptosystem processing operations. In some embodiments, for any point A that is an integer on a number line, a double calculation operation among the plurality of point double calculation operations may represent the calculation of $A^2$ mod N. For example, for the RSA cryptosystem, A may be a number in a certain number field, and may also be referred to as a point in this number field.

In Step S12, the cryptosystem processing circuit 200 (e.g., the core circuit 210) may utilize the point add calculation circuit 230 to perform the plurality of point add calculation operations related to predetermined cryptosystem. For example, in a situation where the plurality of cryptosystem processing operations of the cryptosystem processing circuit 200 are the plurality of RSA cryptosystem processing operations related to the RSA cryptosystem, the plurality of point add calculation operations may represent a plurality of RSA point add calculation operations among the plurality of RSA cryptosystem processing operations. In some embodiments, for any two points A and B that are integers on the number line, a point add calculation operation among the plurality of point add calculation operations may represent the calculation of A×B mod N.

In Step S13, in response to there being no need to perform any point add calculation operation related to the predetermined cryptosystem, such as any RSA point add calculation operation related to the RSA cryptosystem, the cryptosystem processing circuit 200 (e.g., the core circuit 210) may utilize the dummy point add calculation circuit 240 to perform a dummy point add calculation operation to emulate a calculation time of performing the any point add calculation operation (e.g., the any RSA point add calculation operation), without changing a calculation result (e.g., an RSA calculation result) before performing the dummy point add calculation operation.

For better comprehension, the method may be illustrated with the working flow shown in FIG. 3, but the present invention is not limited thereto. According to some embodiments, one or more steps may be added, deleted, or modified in the working flow shown in FIG. 3.

Regarding the plurality of cryptosystem processing operations, some implementation details are further described as follows. During decryption, the cryptosystem processing circuit 200 may need to perform the following operations multiple times:

$$A \times B \bmod N;$$

where the N represents modulus, the symbol "mod" represents a modulo operation, the symbol "×" represents a multiplication operation, A, B and N can be integers, and A<N and B<N. In order to accelerate the calculation speed, the cryptosystem processing circuit 200 can perform conversion on associated parameters to perform calculation in a Montgomery field, and more particularly, can perform multiplication and Montgomery reduction simultaneously. The calculation as described above can be the calculation of any Montgomery step among a plurality of Montgomery steps of the Montgomery reduction (REDC) algorithm. Additionally, the normal field may be a prime field.

In some embodiments, the cryptosystem processing circuit 200 may calculate $T = A \times B \times R^{-1}$ mod N. A certain parameter calculated in the Montgomery field may be set as a corresponding parameter calculated in the normal field that is multiplied by R. Therefore, returning to the normal field, the cryptosystem processing circuit 200 may calculate as follows:

$$T \times R^2 \bmod N = ((A \times B \times R^{-1}) \times R^2) \times R^{-1} \bmod N = A \times B \bmod N;$$

where the above-mentioned point double calculation operations may correspond to A=B, and the above-mentioned point add calculation operations may correspond to A≠B.

For better comprehension, the base r may be equal to any value among a set of predetermined values such as $2^{16}$, $2^{32}$, $2^{64}$, etc., K may represent the RSA width (measured in bits), and the respective bit widths of A, B, and N may be less than or equal to (K−1). For example:

$r = 2^{64}$;
$K = 512$; and
$K' = (512/64)$;

where K' may represent the number of times the loop is executed when calculating in unit of the bit width of r. In addition, $R = r^{K'}$, which can be expressed with the base r, and N<R. The notation "$\Sigma_{i=0}^{K-1}$" represents the summation with the index i changing from 0 to (K−1) (e.g., i=0, 1, . . . or (K−1)), and N can be expressed as follows:

$$N = \Sigma_{i=0}^{K-1}(n_i \times r^i), n_i \text{ belongs to } \{0,1, \ldots, 64'\text{hFFFFFFFFFFFFFFFF}\};$$

where a value starting with the symbol "h" represents the value in hexadecimal format, and the symbol "64'h" represents that this value has 64 bits, so 64'hFFFFFFFFFFFFFFFF can be regarded as a value of 64 bits with each bit being equal to 1.

The commonly used bit width (e.g., the RSA width K) of the RSA cryptosystem is typically more regular, in particular, can be any value among 512 (e.g., $R = 2^{512}$), 1024 (e.g., $R = 2^{1024}$), 1536 (e.g., $R = 2^{1536}$), 2048 (e.g., $R = 2^{2048}$), 3072 (e.g., $R = 2^{3072}$), 4096 (e.g., $R = 2^{4096}$), etc. For ECC, R can be a power of 2 other than (N+1) bits (i.e., $R \neq 2^{(N+1)}$), but is not limited thereto.

In addition, A, B and T can be expressed as follows:

$$A = \Sigma_{i=0}^{K-1}(a_i \times r^i);$$

$$B = \Sigma_{i=0}^{K-1}(b_i \times r^i);$$

$$T = A \times B = A \times \Sigma_{i=0}^{K-1}(b_i \times r^i) = \Sigma_{i=0}^{K-1}(A \times b_i \times r^i);$$

where $T_i = (A \times b_i \times r^i)$. A and B can be very large numbers, and T=A×B can be an even larger number having many bits. For better comprehension, the calculation related to T can be expressed with pseudo-code as follows:

```
for(int i = 0; i <= (K' - 1) ; i++)  {   //K' = RSA_WIDTH/(r_width);
    T += b[i] * A;
    m = T_LO * (r - N_LO)^-1 mod r;
    T += m * N;
    T /= r;
if(T > N) return (T - N), else return T;
```

In the above pseudo-code, the symbol "*" may represent a multiplication operation and may be regarded as equivalent to the symbol "×", the symbol "+=" may represent addition assignment, and the symbol "/=" may represent division assignment, b[i] may represent the above-mentioned and the text starting with the symbol "//" until the end of the same line represents the corresponding comment, where the comment "//K'=RSA_WIDTH/(r_width);" indicates that K' is equal to the RSA width K (e.g., RSA_WIDTH) divided by the bit width of r (e.g., r_width). For example, when $r = 2^{64}$, $T_{LO}$ may represent the value of the lowest 64 bits (e.g., the $63^{rd}$ bit to the $0^{th}$ bit) of T, and $N_{LO}$ may represent the value of the lowest 64 bits (e.g., the $63^{rd}$ bit to the $0^{th}$ bit) of N. In addition, "if (T>N) return (T−N)" in the last line of the above pseudo-code may correspond to the calculation of (T mod N). In order to simplify the calculation, the modulo operation can be directly replaced with the subtraction in a situation where the calculation conforms to the Montgomery reduction algorithm, so it is preferably required that T<2N (rather than A<N and B<N which are generally required).

After each Montgomery step, the calculation result of $(A \times B \times R^{-1} \bmod N)$, rather than $(A \times B \bmod N)$, can be obtained, where R is the Montgomery multiplier. For ease of operation and implementation, R can be set as a value of a power of 2, such as $2^K$ (i.e., $R=2^K$), where the RSA width K can also be referred to as the RSA bit width. Taking 512-bit RSA as an example, $R=2^{512}$, that is, the $512^{th}$ bit of R is 1, and the other bits such as the $511^{th}$ bit to the $0^{th}$ bit are 0. In addition, calculation of $(X^e \bmod N)$ is needed in the RSA cryptosystem, where the symbol "e" may represent a key, such as any of a private key and a public key.

The binary exponentiation algorithm or the modular exponentiation algorithm used in RSA scalar multiplication can be helpful on increasing the calculation speed, and more particularly, can be used for calculating $X^e \bmod N$. Given that X, e and N are integers, and $e \geq 0$ and $0 \leq X < N$, and $(X^e \bmod N)$ is required to be calculated. For example:

$$e = 205 = (11001101)_2 = 2^7 + 2^6 + 2^3 + 2^2 + 2^0;$$

wherein the symbol "$(\ )_2$" may represent a binary value. In the above-mentioned calculation, only 4 more modular multiplication operations are required to generate $(X^{205} \bmod N)$:

$$X^{205} = (X^{(2^7)} \times X^{(2^6)} \times X^{(2^3)} \times X^{(2^2)} \times X^{(2^0)}) \bmod N;$$

for better comprehension, the above calculation may be expressed with pseudo-code as follows:

```
Integer fastExp2(Integer X, Integer e, Integer N)
  if(e == 0)
    return 1;
  f = X;
  for(i = (g – 1), (g – 2), ..., 0)
    if(β_i == 0)
      f = f² mod N;
    else
      f = f²X mod N;
  return f;
``` in the above-listed pseudo-code, the symbol "g" may represent the length of the binary representation $\{(\beta_{g-1}, \beta_{g-2}, \ldots, \beta_0\}$ of e, the symbol "$\beta_i$" may represent the value of any bit in the binary representation $\{\beta_{g-1}, \beta_{g-2}, \ldots, \beta_0\}$ of e, and the symbol "f" may represent an intermediate value during the calculation. For example:

$$e = 205 = \{\beta_7, \beta_6, \beta_5, \beta_4, \beta_3, \beta_2, \beta_1, \beta_0\};$$

wherein g=8 (i.e., the length of $(11001101)_2$), $\beta_0 = \beta_2 = \beta_3 = \beta_6 = \beta_7 = 1'b1$ (i.e., single bit $(1)_2$), and $\beta_1 = \beta_4 = \beta_5 = 1'b0$ (i.e., single bit $(0)_2$).

It is assumed that the method of scanning from the Most Significant Bit (MSB) to the Least Significant Bit (LSB) is utilized, and $X^{205}$ may be expressed as follows:

$$X^{205} = ((((((X^2 \times X)^2)^2)^2) \times X)^2 \times X)^2)^2 \times X;$$

in the above equation, "^2" (i.e., the power of 2) may be taken as an example of the aforementioned point double calculation operation, and "×X" may be taken as an example of the aforementioned point add calculation operation. The above equation may be rewritten as:

$$X^{205} = X^{(2^7)} \times X^{(2^6)} \times X^{(2^3)} \times X^{(2^2)} \times X; \text{ or}$$

$$X^{205} = X^{(2^7 + 2^6 + 2^3 + 2^2 + 2^0)}.$$

It is noted that, the point double calculation operation is performed every time a scanning step of 1 bit is moved. When the $6^{th}$ bit is scanned after the $7^{th}$ bit, the cryptosystem processing circuit 200 may detect that the $6^{th}$ bit is equal to 1, and may first perform the point double calculation operation (e.g., a square operation) and then perform the point add calculation operation; when the $5^{th}$ bit is scanned after the $6^{th}$ bit, the cryptosystem processing circuit 200 may detect that the $5^{th}$ bit is equal to 0, and may only perform the point double calculation operation (e.g., a square operation); and the rest can be deduced by analogy. The e may be referred to as a private key. Since the private key is typically an exponent in the associated calculation (e.g., the calculation of $(X^e \bmod N)$), if a person can know the calculation currently being performed is the point double calculation operation or the point add calculation operation according to the power difference, the person can easily guess the private key. The respective lengths of time to perform the respective calculation for respective points are different from each other. For example, the calculation of the point corresponding to bit 1 may comprise the point double calculation and the point add calculation, and the calculation of the point corresponding to bit 0 may only comprise the point double calculation (without any point add calculation), so executing the former can take longer time than executing the latter.

Therefore, the cryptosystem processing circuit 200 can be designed to maintain a constant length of time for performing calculation of the point corresponding to any bit (e.g., bit 0 or bit 1), in particular, regardless of whether the current bit is 0 or 1, always perform the point double operation (e.g., one of the plurality of point double operations) and then perform the point add operation (e.g., one of the plurality of point add operations, or the dummy point add operation), making it be impossible for any attacker to crack the private key simply according to the time difference. Based on the method shown in FIG. 3, the cryptosystem processing circuit 200 can maintain the time length such as the length of time for performing the calculation of the point corresponding to the any bit to a constant time without any error in the calculation result, where the method can be referred to as a double-and-add-always method. When performing the point add operation, the cryptosystem processing circuit 200 can determine whether the current bit is 1. If the current bit is 1, the cryptosystem processing circuit 200 can perform a real point add calculation (e.g., one of the plurality of point add calculation operations); if the current bit is 0, the cryptosystem processing circuit 200 can perform a dummy point add calculation (e.g., the dummy point add operation operation). The dummy point add calculation may be a true two point add calculation such as the add calculation of true two points, but the present invention is not limited thereto. The dummy point add calculation may be a fake arbitrary value point add calculation. In addition, the cryptosystem processing circuit 200 may take the same number of clock cycles to perform the dummy point add calculation or the real point add calculation.

Assume that the symbol "X" represents plain text such as a message before encryption, and the symbol "Y" represents the encrypted cryptograph. For example, regarding the calculation of $Y = X^e \bmod N$, the cryptosystem processing circuit 200 can perform the dummy point add calculation operation as follows:

$$X' = X \times R \bmod N = X \times R^2 \times (R-1) \bmod N;$$

where $R^2 \bmod N$ can be pre-calculated. Regarding the calculation of $Y = X^e \bmod N$, during the calculation of an intermediate value $y = X^{MID}$ (e.g., the symbol "MID" represents a positive integer corresponding to the intermediate value y), if a target bit such as the next bit is 1, then the cryptosystem processing circuit 200 can perform the real point add calculation such as y×X mod N, otherwise (this means that the next bit is 0), the cryptosystem processing circuit 200 can perform the dummy point add calculation as follows:

$$y \times (R-N) \times R^{-1} \bmod N = y \times R^{-1} \bmod N = y \bmod N;$$

$$(R-N) \bmod N = R \bmod N + N \bmod N = R \bmod N;$$

$$R \times R^{-1} \bmod N = 1;$$

but the present invention is not limited thereto.

Taking N having 512 bits as an example, $R=2^{512}$, which is 1 bit more than N. When the calculation is based on a 512-bit range, then for unsigned subtraction, R−N=|0−N|, for example, R={1'b1, 512'h0} (that is, R $512^{th}$ bit of R is 1, and the other bits such as $511^{th}$ bit to $0^{th}$ bit are 0), and N=512'h{X4, X3, X2, X1} (which is not equal to 0), for example:

```
N ={{64'h..., 64'h... },
    {64'hAAAABBBB, 64'hCCCCDDDD},
    {64'h..., 64'h... },
    {64'h11112222, 64'h33334443}};
but the present invention is not limited thereto.
```

As can be seen from the above example, this calculation does not affect the actual result, which means that this calculation can achieve the same calculation result as that without performing any point add calculation. According to an embodiment, the cryptosystem processing circuit 200 may pre-calculate and store (R−N) for subsequent direct use. According to another embodiment, in a situation where (R−N) does not need to be pre-calculated, although it may be needed to increase a logic gate count, the cryptosystem processing circuit 200 may be equipped with a corresponding subtraction calculation unit for processing the calculation of (R−N) at any time, so implementing the cryptosystem processing circuit 200 based on the method does not significantly increase too many logic gates, where these logic gates may be a certain number of multiplexers (MUXs). The cryptosystem processing circuit 200 may subtract a current bit range of N with 0 while reading a bit range of N, for example, in the case of calculating once every 64 bits, the cryptosystem processing circuit 200 may read a bit range BIT[63:0], and read the next bit range BIT[127:64] next time, and the rest can be deduced by analogy. Given that in R, only the MSB is 1 and the remaining bits are 0, assuming that we use a 512-bit space to perform calculation (taking 512-bit RSA as an example), during calculating (R−N), the MSB is 1 and there is no need to calculate, sign bit is ignored, and unsigned subtraction is used, so just use (0−N) to represent (R−N) to get exactly the same result as that of (R−N). According to some embodiments, when the power consumption of the above-listed operations is slightly increased, the cryptosystem processing circuit 200 may also use the subtraction unit to perform dummy subtraction operations during performing the real point add calculation (e.g., one of the plurality of point add calculation operations), to make the power consumption be similar to that of the dummy point add calculation.

Figure 4:
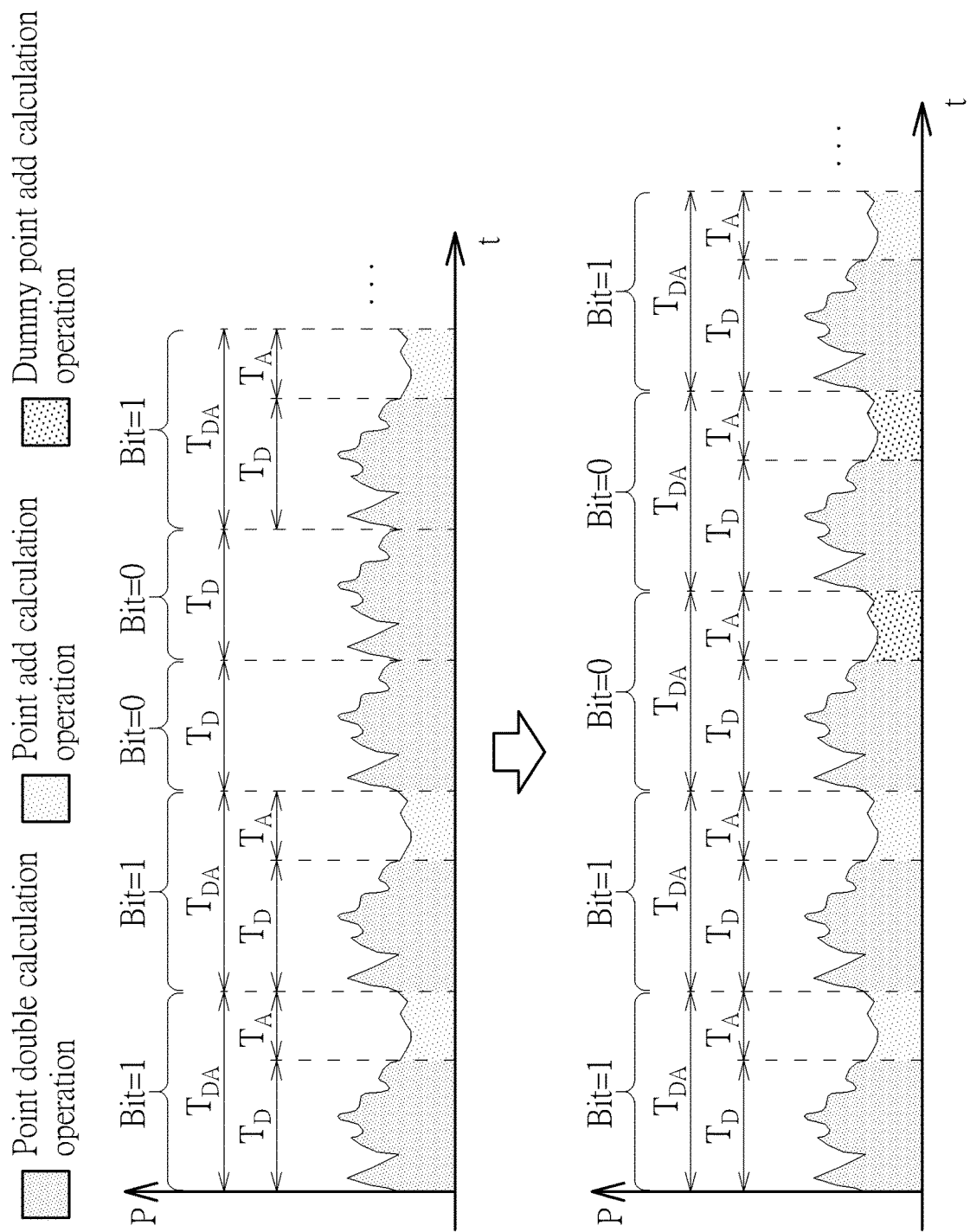
FIG. 4 is a diagram illustrating a dummy point add control scheme of the method according to an embodiment of the present invention.

FIG. 4, for example, the lower half thereof, is a diagram illustrating a dummy point add control scheme of the method according to an embodiment of the present invention, where the upper half of FIG. 4 illustrates a no dummy point add control scheme in which no dummy point add calculation operation is performed for ease of comparison. In any of the dummy point add control scheme and the no dummy point add control scheme, the horizontal axis may represent time t, and the vertical axis may represent power consumption P (e.g., the power consumption of the cryptosystem processing circuit 200).

As shown in the upper half of FIG. 4, when the current bit is 1 (labeled "Bit=1" for brevity), the point double calculation (e.g., one of the plurality of point double operations) may take the time length $T_D$, and the point add calculation (e.g., one of the plurality of point add calculation operations) may take the time length $T_A$, so the time length of the calculation of the current bit may be equal to $T_{DA}$, where $T_{DA}=(T_D+T_A)$. When the current bit is 0 (labeled "Bit=0" for brevity), the point double calculation (e.g., one of the plurality of point double operations) may take the time length $T_D$, so the time length of the calculation of the current bit may be equal to $T_D$. Since the respective time lengths (together with the corresponding power consumption) of the respective calculations of bit 0 and bit 1 differ from each other, the no dummy point add control scheme may weaken the cryptosystem.

As shown in the lower half of FIG. 4, when the current bit is 1 (labeled "Bit=1" for brevity), the point double calculation (e.g., one of the plurality of point double operations) may take the time length $T_D$, and the point add calculation (e.g., one of the plurality of point add calculation operations) may take the time length $T_A$, so the time length of the calculation of the current bit may be equal to $T_{DA}$, where $T_{DA}=(T_D+T_A)$. When the current bit is 0 (labeled "Bit=0" for brevity), the point double calculation (e.g., one of the plurality of point double operations) can take the time length $T_D$, and the dummy point add calculation (e.g., the dummy point add calculation operation) may take the time length $T_A$, so the time length of the calculation of the current bit may be equal to $T_{DA}$, where $T_{DA}=(T_D+T_A)$. Since the respective time lengths (together with the corresponding power consumption) of the respective calculations of bit 0 and bit 1 are the same as each other, the dummy point add control scheme can enhance the cryptosystem. For brevity, similar descriptions for this embodiment are not repeated in detail here.

According to some embodiments, the cryptosystem processing circuit 200 may actually perform the calculation of y×X×R$^{-1}$ mod N, but not store the final result into any buffer or any memory, wherein in comparison with the real point add calculation, the power consumption may become slightly lower, but the present invention is not limited to this. For example, the cryptosystem processing circuit 200 may actually perform the calculation of y×X×R$^{-1}$ mod N, and perform an address swap operation on the buffer, making the power consumption be closer to that of the power consumption of the real point add calculation. For brevity, similar descriptions for these embodiments are not repeated in detail here.

Figure 5:
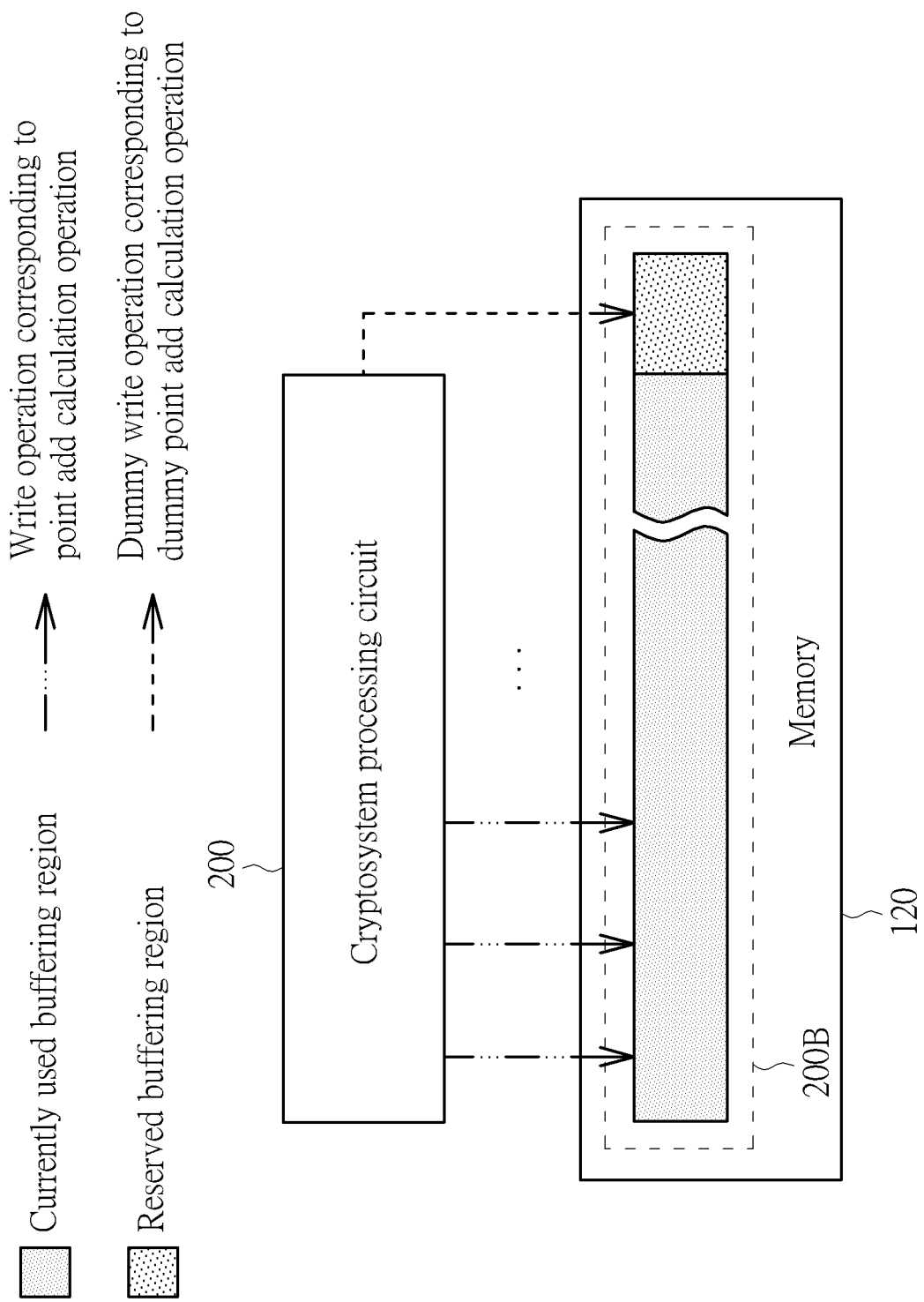
FIG. 5 is a diagram illustrating a dummy write control scheme of the method according to an embodiment of the present invention.

FIG. 5 is a diagram illustrating a dummy write control scheme of the method according to an embodiment of the present invention. The cryptosystem processing circuit 200 can actually perform the calculation of y×X×R$^{-1}$ mod N, and perform dummy write on the buffer 200B in the memory 120 through the address swap operation. For example, when the current bit is 1, the cryptosystem processing circuit 200 may perform the point double calculation (e.g., one of the plurality of point double calculation operations) and perform the point add calculation (e.g., one of the plurality of point add calculation operations), in particular, may perform a write operation corresponding to the point add calculation operation on the currently used buffering region in the buffer 200B. When the current bit is 0, the cryptosystem processing circuit 200 may perform the point double calculation (e.g., one of the plurality of point double calculation operations) and perform the dummy point add calculation (e.g., the dummy point add calculation operation), in particular, may perform a dummy write operation corresponding to the dummy point add calculation operation on a reserved buffering region in the buffer 200B. The reserved buffering region may represent a currently unused buffering region other than the currently used buffering region in the buffer 200B, such as a buffering region at a predetermined address, where the predetermined address may be a fixed address. For brevity, similar descriptions for this embodiment are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of defense against cryptosystem timing attack, comprising:
   utilizing a point double calculation circuit to perform a plurality of point double calculation operations related to a Rivest-Shamir-Adleman (RSA) cryptosystem;
   utilizing a point add calculation circuit to perform a plurality of point add calculation operations related to the RSA cryptosystem; and
   in response to there being no need to perform any point add calculation operation related to the RSA cryptosystem, utilizing a dummy point add calculation circuit to perform a dummy point add calculation operation to emulate a calculation time of performing the any point add calculation operation, without changing a calculation result before performing the dummy point add calculation operation;
   wherein the dummy point add calculation operation comprises emulating a point add calculation operation through parameter substitution; the parameter substitution comprises multiplying a term in a process of Montgomery reduction by (R−N), wherein the N represents the modulus, and the R is a Montgomery multiplier; and regarding calculation of $Y=X^e \mod N$, during calculating an intermediate value $y=X^{MID}$, in response to a target bit being 1, the dummy point add calculation operation replaces calculation of y×X mod N with calculation of $y \times (R-N) \times R^{-1} \mod N$ to emulate the point add calculation operation, wherein the symbol "X" represents plain text, the symbol "Y" represents cryptograph, the symbol "e" represents a key, the symbol "MID" represents a positive integer corresponding to the intermediate value, the symbol "mod" represents a modulo operation, and the symbol "×" represents a multiplication operation.

2. The method of claim 1, wherein for any point A that is an integer on a number line, a double calculation operation among the plurality of point double calculation operations represents calculation of $A^2 \mod N$.

3. The method of claim 1, wherein for any two points A and B that are integers on a number line, a point add calculation operation among the plurality of point add calculation operations represents calculation of A×B mod N.

4. A cryptosystem processing circuit that operates according to the method of claim 1, wherein the cryptosystem processing circuit comprises:
   a core circuit, arranged to control a plurality of cryptosystem processing operations that are related to the RSA cryptosystem in the cryptosystem processing circuit, wherein the plurality of cryptosystem processing operations comprise the plurality of point double calculation operations and the plurality of point add calculation operations;
   the point double calculation circuit, coupled to the core circuit, arranged to perform the plurality of point double calculation operations;
   the point add calculation circuit, coupled to the core circuit, arranged to perform the plurality of point add calculation operations; and
   the dummy point add calculation circuit, coupled to the core circuit, arranged to perform the dummy point add calculation operation.

5. An electronic device comprising the cryptosystem processing circuit of claim 4, further comprising:
   a processor, arranged to control operations of the electronic device;
   a memory, arranged to temporarily store information for the electronic device; and
   a communications interface circuit, arranged to perform communications operations for the electronic device.

6. An electronic device comprising the cryptosystem processing circuit of claim 4, wherein the electronic device comprises:
   a processor, arranged to control operations of the electronic device, wherein the core circuit is implemented by the processor;
   wherein the electronic device further comprises:
   a memory, arranged to temporarily store information for the electronic device; and
   a communications interface circuit, arranged to perform communications operations for the electronic device.

7. A method of defense against cryptosystem timing attack, comprising:
   utilizing a point double calculation circuit to perform a plurality of point double calculation operations related to a Rivest-Shamir-Adleman (RSA) cryptosystem;
   utilizing a point add calculation circuit to perform a plurality of point add calculation operations related to the RSA cryptosystem on a currently used buffering region in a buffer; and
   in response to there being no need to perform any point add calculation operation related to the RSA cryptosystem, utilizing a dummy point add calculation circuit to perform a dummy point add calculation operation to emulate a calculation time of performing the any point add calculation operation, without changing a calculation result before performing the dummy point add calculation operation;
   wherein the dummy point add calculation operation comprises performing dummy write on a reserved buffering region of the buffer corresponding to a predetermined address through address swap to emulate a point add calculation operation through parameter substitution, wherein the predetermined address is a fixed address chosen so that a power consumption of the dummy point add calculation operation approaches a power consumption of the point add calculation operation.

8. A cryptosystem processing circuit that operates according to the method of claim 7, the cryptosystem processing circuit comprising:
   a core circuit, arranged to control a plurality of cryptosystem processing operations that are related to the RSA cryptosystem in the cryptosystem processing circuit, wherein the plurality of cryptosystem processing operations comprise the plurality of point double calculation operations and the plurality of point add calculation operations;

the point double calculation circuit, coupled to the core circuit, arranged to perform the plurality of point double calculation operations;

the point add calculation circuit, coupled to the core circuit, arranged to perform the plurality of point add calculation operations; and the dummy point add calculation circuit, coupled to the core circuit, arranged to perform the dummy point add calculation operation.

9. An electronic device comprising the cryptosystem processing circuit of claim 8, further comprising:

a processor, arranged to control operations of the electronic device;

a memory, arranged to temporarily store information for the electronic device; and a communications interface circuit, arranged to perform communications operations for the electronic device.

10. An electronic device comprising the cryptosystem processing circuit of claim 8, wherein the electronic device comprises:

a processor, arranged to control operations of the electronic device, wherein the core circuit is implemented by the processor;

wherein the electronic device further comprises:

a memory, arranged to temporarily store information for the electronic device; and a communications interface circuit, arranged to perform communications operations for the electronic device.

* * * * *